Jan. 6, 1931.　　　O. H. ATTRIDGE　　　1,788,141
BRAKE EQUALIZER
Filed Dec. 13, 1928　　　2 Sheets-Sheet 1

INVENTOR
Oliver H. Attridge
BY
Philip S. McLean
ATTORNEY

Jan. 6, 1931.  O. H. ATTRIDGE  1,788,141
BRAKE EQUALIZER
Filed Dec. 13, 1928    2 Sheets-Sheet 2
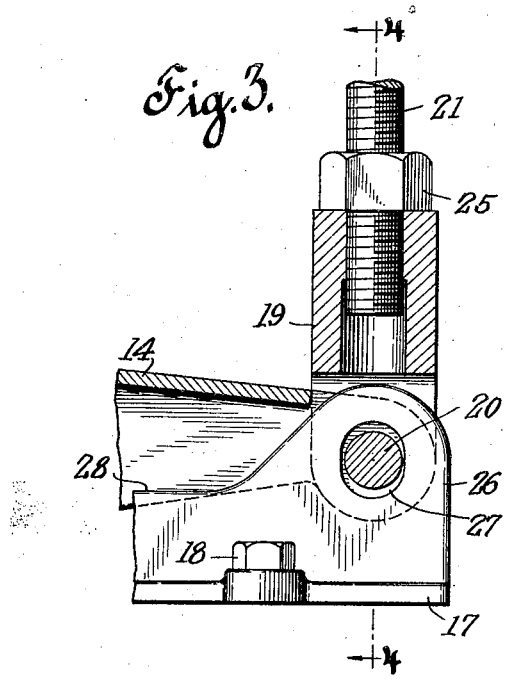
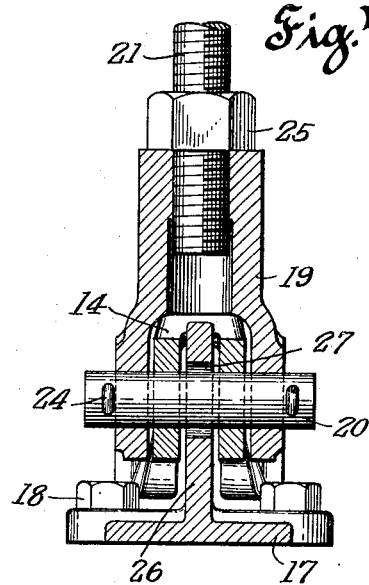
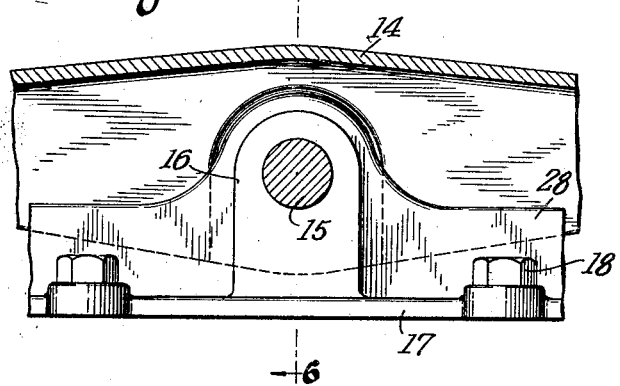
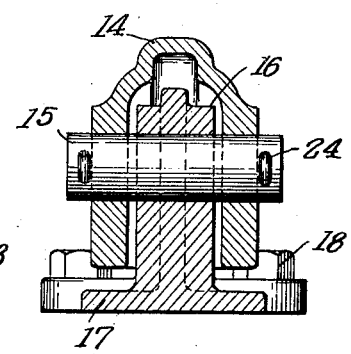
INVENTOR
Oliver H. Attridge
BY
Philip S. McLean
ATTORNEY Patented Jan. 6, 1931

1,788,141

UNITED STATES PATENT OFFICE

OLIVER H. ATTRIDGE, OF CHATTANOOGA, TENNESSEE, ASSIGNOR TO LUCEY MANUFACTURING CORPORATION, OF CHATTANOOGA, TENNESSEE, A CORPORATION OF TENNESSEE

BRAKE EQUALIZER

Application filed December 13, 1928. Serial No. 325,680.

Special objects of this invention are to provide practical and efficient means for equalizing the braking force on hoisting drums and to safeguard the mechanism in case of breakage of a brake band or parts pertaining thereto.

Other important objects are to provide such means in a form readily applicable to existing apparatus.

The foregoing and other objects are attained by certain novel features of construction, combination and relations of parts as will be clear from the following specification.

The drawings accompanying and forming part of the specification illustrate one practical commercial embodiment of the invention, but it will be understood that modifications and changes may be made in the structure without departure from the true spirit and broad scope of the invention.

Figure 1:
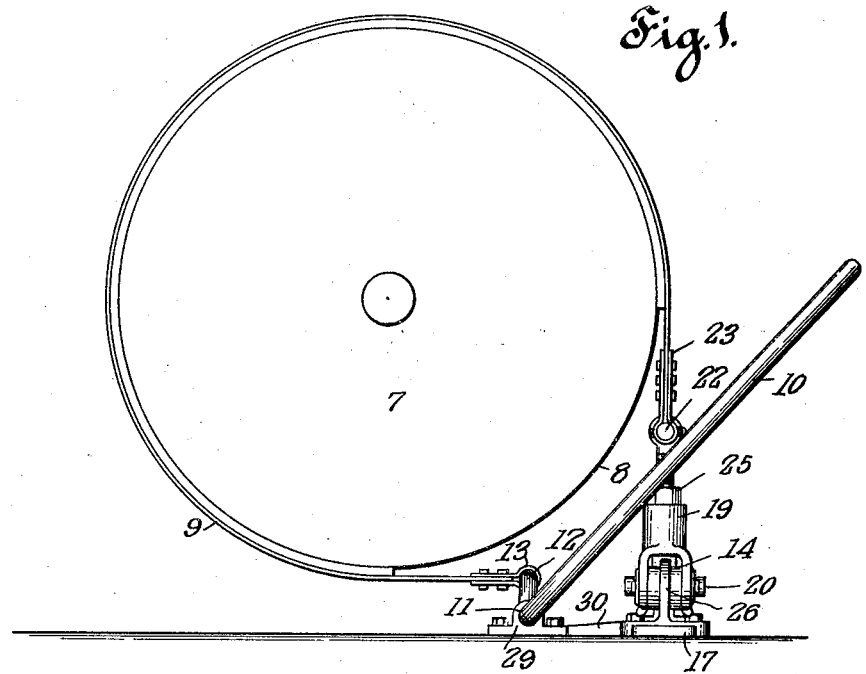
Figure 2:
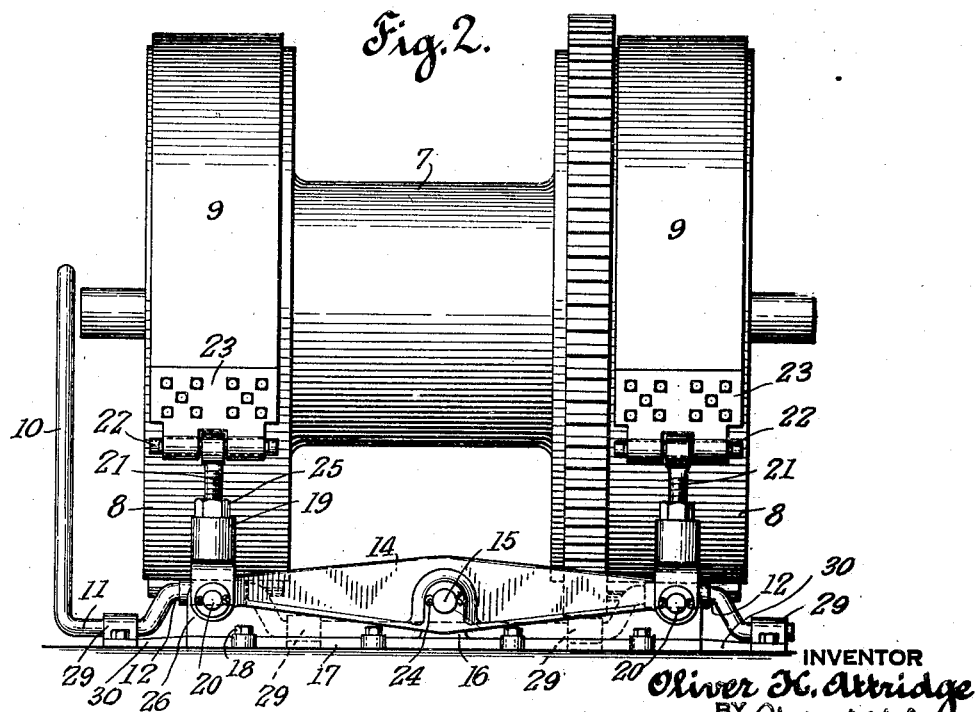

Fig. 1 is an end elevation of the equalizer in its association with a hoisting drum; Fig. 2 is a front view of the equalizer and drum; Fig. 3 is an enlarged broken sectional view of the right hand end of equalizer bar in Fig. 2, with the attached brake band clevis and guard; Fig. 4 is a broken cross-sectional view of the same as on line 4—4, Fig. 3; Fig. 5 is a broken sectional view illustrating particularly the pivotal mounting of the equalizer bar; Fig. 6 is a cross-sectional view of the latter as on line 6—6 of Fig. 5.

In Figs. 1 and 2, a hoisting drum of more or less conventional form is indicated at 7 having brake flanges 8 for engagement by brake bands 9. The latter are shown as operated in the usual way by means of a hand lever 10 on shaft 11, which has cranks 12 engaged by straps 13 on the ends of the brake bands.

The equalizer consists of bar 14 pivoted intermediate its ends on a center pin 15 and having the "anchored" ends of the brake bands connected with the opposite ends of the same.

The equalizer bar is shown as of channel form, Figs. 5 and 6, particularly to give it great rigidity and strength, and so that it fits over and houses the central bearing post 16 carrying the pivot pin. This pivot mounting is shown as carried by a heavy base 17, which may be securely fastened down on the derrick floor by bolts 18.

The connections between the ends of the equalizer bar and the brake bands are shown as clevises 19 pivoted to the ends of the bar by pins 20 and having eye bolts 21 threaded into them, which engage over pins 22 in the loops of the end straps 23 on the brake bands. The several pivotal pins 15, 20 and 22 are shown as secured against accidental displacement by cotter pins 24 and the eye bolts 21 are shown as secured in their positions of adjustment in the clevises by lock nuts 25.

With the construction thus far described, it will be obvious that downward pressure on the brake lever 10 in Fig. 1 will have the effect of setting both brake bands equally, the equalizer bar rocking on its center pivot 15 if necessary, to compensate for inequalities in the two brake bands. Adjustment of the eye bolts in the clevises enables a preliminary setting of the brake band connections to insure an approximately equal engagement of the brake bands and the equalizer automatically takes care of any inequalities that may thereafter exist.

To guard against failure of the brake mechanism in the event of breakage of a brake band, a clevis or the like, safety holds are provided, which in the present disclosure take the form of guards 26 encircling the clevis pins 20 and having elongated openings 27 in which said clevis pins may freely operate during the ordinary balancing actions of the equalizer bar. These guards are shown as upstanding lugs on the end portions of the equalizer base 17, extending up between the sides of the hollow channel equalizer bar and are indicated as connected by webs 28 with the central bearing lug 16. Thus the intermediate and the two end lugs on the base plate are braced and rigidly connected together by an integral upstanding flange, making said base and its parts particularly strong and capable of withstanding any unusual strains.

While the openings 27 in the guards 26 permit free normal action of the equalizer bar, it is evident that in the event of any unusual or extreme movement of the equalizer bar, one or the other, or both these guards will come into action to limit further motion of the equalizer bar and parts associated therewith. Thus, in case of one brake band giving away, the equalizer bar will simply swing far enough for the guards to come into action, enabling the remaining brake band to carry the load. This will be so in case of breakage of any of the parts associated with the brake bands such as the pivot pins, clevises or eye bolts. Furthermore, even if the pivot 15 for the equalizer beam gives away the beam will still be held by engagement of the guards 26 with the clevis pins 20 in the ends of the beam. The hollow beam operating over the upstanding pivot and guard lugs on the base forms a compact as well as a particularly strong structure and forms a housing covering said lugs and the webs connecting the same and preventing objects being passed under the beam which might in the rocking movements of the beam be caught between the beam and the base. The bearings 29 for the brake shaft may be formed separately and mounted independently of the equalizer base, but if desired, said bearings may be carried by and formed as extensions of said base as indicated at 30 in Figs. 1 and 2.

It will be seen that by this invention the brakes are automatically equalized and utilizing this same construction, the brakes are protected so that in case of failure of one the other becomes fully effective, and further that even in case of failure of the equalizer bar or its pivotal mounting the brakes will still be held properly anchored and can be used to control the drum.

What is claimed is:

1. Brake equalizer mechanism, comprising an equalizer beam pivotally mounted intermediate its ends, brake bands connected with the opposite ends of said beam, brake setting means engaged with said brake bands and guard means surrounding portions on the equalizer beam at opposite sides of the pivotal mounting and thereby cooperating with said equalizer beam to limit motion of the beam a predetermined extent in either direction, whereby said beam will be maintained effective to control one brake band if the other brake band should fail.

2. Brake equalizer mechanism, comprising a base plate having spaced upstanding lugs and an intermediate upstanding lug between the same, an equalizer bar pivoted intermediate its ends to said intermediate lug, brake members and connections from said brake members to the ends of the equalizer bar including connecting pins, said spaced lugs on the base having clearance openings for said pins enabling free normal equalizing movements of the equalizer bar and to limit such equalizer bar to such movements.

3. A construction as in claim 2, with upstanding webs connecting said intermediate and end lugs.

4. A construction as in claim 2, with upstanding webs connecting said intermediate and end lugs, said equalizer bar having an inverted channel portion covering said lugs and webs.

5. Brake equalizer mechanism including an equalizer bar pivotally supported intermediate its ends, brakes connected with said equalizer bar at opposite sides of said pivotal support and guards overstanding portions on the equalizer bar for limiting the movements of the equalizer bar to those necessary for the brake equalizing action.

6. Brake equalizing mechanism, comprising in combination brake bands, a rocking equalizer bar, clevises connected with the brake bands, pins connecting said clevises with the equalizing bar and guards about said clevis pins but positioned to permit free equalizing movements of the equalizer bar.

7. Brake equalizer mechanism comprising a base plate having upstanding guards and an intermediate pivot lug, an equalizer beam pivoted intermediate its ends to said pivot lug, clevis pins in the ends of said equalizer bar in cooperative relation to said guards, clevises attached to said pins and brake bands attached to said clevises.

8. A brake equalizer comprising a rocking equalizer beam, brake bands, connections from the brake bands to said rocking beam, said connections extending transversely of the beam and guards over said transversely extending connections.

9. A brake equalizer comprising a base, an equalizer beam pivoted on said base, guards on said base provided with openings, brake bands and connections from said brake bands to the equalizer beams including pins operating freely in said openings.

10. Brake equalizer mechanism comprising a base having an intermediate and two end lugs and provided with brake shaft bearings, a brake shaft journalled in said bearings, an equalizer bar pivoted to the intermediate lug of the base, clevis pins in the ends of the equalizer beam, said end lugs having openings with clearance for said clevis pins in the normal equalizing movements of the beam, but adapted to hold the beam against other than normal equalizing movements, clevises on said pins and connected with the brake bands and connections between the other ends of the brake bands and the brake shaft journalled on the base.

11. In a brake equalizer, the combination with brake members, a pivotal mounting, guards at opposite sides of said pivotal mounting, an equalizer bar consisting of a channel beam inverted over said guards and arranged to rock intermediate its ends on said pivotal mounting, attachment pins carried by said beam and operating in said guards and connections from said attachment pins to the brake members.

12. A brake equalizer, comprising an equalizer bar pivotally supported intermediate its ends, transversely extending means at the ends of the same for enabling connection with the brake bands of a hoisting drum and guards about portions of said transversely extending means on said beam for limiting rocking movement of the same and for securing said beam in the event of breakage of the intermediate pivotal support.

13. A brake equalizer, comprising an equalizer bar having forked ends and pivotally supported intermediate its ends, brake band connecting pins carried by said forked ends of the equalizer bar and guard lugs entered in the forked ends of said equalizer bar and having openings freely receiving said brake band connecting pins.

14. A brake equalizer, comprising an equalizer bar having forked ends and pivotally supported intermediate its ends, brake band connecting pins carried by said forked ends of the equalizer bar, guard lugs entered in the forked ends of said equalizer bar and having openings freely receiving said brake band connecting pins and yoke members arched over the forked ends of the equalizer bar and engaged with the connecting pins aforesaid.

15. A brake equalizer, comprising an equalizer bar pivotally supported intermediate its ends, transverse brake band connecting pins in the ends of said equalizer bar, guard lugs having portions extending in the clear about said transverse pins, said guard lugs and equalizer bar having interleaving, overlapping portions.

16. A brake equalizer, comprising an equalizer bar, a base for pivotally supporting said equalizer bar, said bar and base having overlapping portions at the intermediate and end sections of the bar, a pivot stud extending through portions of the bar and base at an intermediate point of the bar for pivotally mounting the bar on the base and transverse brake band connections in the ends of the bar and extending freely through overlapping portions of the bar and base at the ends of the bar, whereby said bar is confined in rocking relation to the base at both the end and intermediate portions of the bar.

In testimony whereof I affix my signature.

OLIVER H. ATTRIDGE.